US009776836B2

(12) United States Patent
Spies et al.

(10) Patent No.: US 9,776,836 B2
(45) Date of Patent: Oct. 3, 2017

(54) ARRANGEMENT FOR CONNECTING TWO RAIL SEGMENTS

(75) Inventors: Gerd Spies, Herdecke (DE); Christoph Passmann, Dortmund (DE)

(73) Assignee: Terex MHPS GmbH, Düsseldorf (DE)

( * ) Notice: Subject to any disclaimer, the term of this patent is extended or adjusted under 35 U.S.C. 154(b) by 1246 days.

(21) Appl. No.: 13/821,469

(22) PCT Filed: Sep. 5, 2011

(86) PCT No.: PCT/EP2011/065336
§ 371 (c)(1),
(2), (4) Date: Mar. 7, 2013

(87) PCT Pub. No.: WO2012/034895
PCT Pub. Date: Mar. 22, 2012

(65) Prior Publication Data
US 2013/0164078 A1 Jun. 27, 2013

(30) Foreign Application Priority Data
Sep. 14, 2010 (DE) .................. 10 2010 037 523

(51) Int. Cl.
*B25G 3/34* (2006.01)
*F16B 11/00* (2006.01)
(Continued)

(52) U.S. Cl.
CPC .................. *B66C 7/02* (2013.01); *B66C 7/14* (2013.01); *E01B 25/24* (2013.01); *F16B 7/00* (2013.01); *Y10T 403/477* (2015.01)

(58) Field of Classification Search
CPC ......... Y10T 403/477; B66C 7/02; B66C 7/14; E01B 25/24; F16B 7/00
(Continued)

(56) References Cited

U.S. PATENT DOCUMENTS

| D47,724 S | 8/1915 | Heulings, Jr. |
| D47,725 S | 8/1915 | Heulings, Jr. |

(Continued)

FOREIGN PATENT DOCUMENTS

| CA | 1203194 | 4/1986 |
| CH | 429816 | 2/1967 |

(Continued)

OTHER PUBLICATIONS

International Search Report and Written Opinion of corresponding PCT Application PCT/EP2011/065336 mailed Dec. 5, 2011.
(Continued)

*Primary Examiner* — Abigail Troy
*Assistant Examiner* — Nahid Amiri
(74) *Attorney, Agent, or Firm* — Gardner, Linn, Burkhart & Flory, LLP

(57) ABSTRACT

An arrangement of two rail segments, consisting of at least one mounting element disposed at each rail segment, and of at least one connector in contact with the mounting elements, by means of which the rail segments can be connected to each other at the end faces thereof, wherein each mounting element is attached to the corresponding rail segment by means of a welding seam. At least one end of the welding seam ends in a region on the rail segment outside of the mounting element.

10 Claims, 3 Drawing Sheets

(51) Int. Cl.
  *F16B 12/04* (2006.01)
  *F16L 13/00* (2006.01)
  *B66C 7/02* (2006.01)
  *F16B 7/00* (2006.01)
  *B66C 7/14* (2006.01)
  *E01B 25/24* (2006.01)

(58) Field of Classification Search
  USPC ............... 403/270, 271, 292, 293, 309–312;
  104/89, 94, 95, 106, 107; 248/58,
  248/222.13, 222.51, 341
  See application file for complete search history.

(56) References Cited

U.S. PATENT DOCUMENTS

| | | | |
|---|---|---|---|
| 1,458,362 A | | 6/1923 | Ryder |
| 2,019,460 A | * | 10/1935 | Mahan ................. 403/270 |
| D158,461 S | | 5/1950 | Hammerly |
| D189,447 S | | 12/1960 | Attwood |
| 3,124,239 A | | 3/1964 | Kornylak |
| D200,099 S | | 1/1965 | Attwood |
| 3,183,480 A | | 5/1965 | Alder, Jr. |
| 3,452,501 A | | 7/1969 | Zimmer et al. |
| D238,510 S | | 1/1976 | Tabler |
| D238,777 S | | 2/1976 | Rodney |
| 3,974,777 A | | 8/1976 | Monne |
| 4,102,007 A | | 7/1978 | Janson |
| 4,524,698 A | | 6/1985 | Tourtellier et al. |
| 4,768,442 A | | 9/1988 | Miller |
| D306,078 S | | 2/1990 | Whitney |
| 4,934,276 A | * | 6/1990 | Garpentin ............... E01B 23/00 104/111 |
| 5,074,407 A | | 12/1991 | Brumby |
| 5,271,586 A | | 12/1993 | Schmidt |
| D346,260 S | | 4/1994 | Silbersky et al. |
| 5,396,681 A | * | 3/1995 | Hara ................. 15/250.31 |
| 5,400,717 A | | 3/1995 | Hoehn |
| 5,410,937 A | | 5/1995 | Okamoto et al. |
| 5,443,151 A | * | 8/1995 | Taylor .................... 198/860.1 |
| 5,598,784 A | * | 2/1997 | Kubsik et al. ................. 104/111 |
| 5,598,785 A | | 2/1997 | Zaguroli, Jr. |
| D381,176 S | | 7/1997 | Patois et al. |
| D384,470 S | | 9/1997 | Kubsik et al. |
| 5,704,571 A | | 1/1998 | Vargo |
| 5,957,057 A | * | 9/1999 | Nakamura et al. ........... 104/111 |
| 6,196,133 B1 | | 3/2001 | Fitzler et al. |
| 6,283,038 B1 | | 9/2001 | Mattila |
| D456,585 S | | 4/2002 | Sandstroem |
| D464,783 S | | 10/2002 | Abbestam |
| D511,580 S | | 11/2005 | Ryan et al. |
| D515,266 S | | 2/2006 | Moe |
| 7,845,285 B2 | | 12/2010 | Hast |
| 7,997,207 B2 | * | 8/2011 | Hess .............................. 104/95 |
| D650,143 S | | 12/2011 | Bhosale et al. |
| 8,079,899 B2 | * | 12/2011 | Schwersmann et al. ....... 460/66 |
| 8,104,731 B2 | | 1/2012 | Faucher et al. |
| D655,884 S | | 3/2012 | Spies et al. |
| 8,251,329 B2 | | 8/2012 | Suciu et al. |
| 8,464,478 B2 | | 6/2013 | Tweedie |
| 8,590,456 B2 | | 11/2013 | Ipsen |
| 2002/0079347 A1 | | 6/2002 | Ezumi et al. |
| 2005/0098059 A1 | | 5/2005 | Wallner |
| 2006/0137564 A1 | | 6/2006 | Wallner |
| 2008/0041806 A1 | | 2/2008 | Birkigt et al. |
| 2008/0230503 A1 | | 9/2008 | Birkigt et al. |
| 2010/0096438 A1 | | 4/2010 | Sato et al. |
| 2011/0191986 A1 | | 8/2011 | Smith |
| 2013/0153730 A1 | | 6/2013 | Spies et al. |
| 2013/0167749 A1 | | 7/2013 | Spies et al. |
| 2013/0167750 A1 | | 7/2013 | Spies et al. |

FOREIGN PATENT DOCUMENTS

| | | | |
|---|---|---|---|
| CN | 1312141 A | | 9/2001 |
| CN | 101595263 A | | 12/2009 |
| CN | 101595264 A | | 12/2009 |
| CN | 101641478 A | | 2/2010 |
| DE | 914895 | | 9/1954 |
| DE | 1249301 | | 9/1967 |
| DE | 7346004 | | 4/1974 |
| DE | 3211923 A1 | | 10/1983 |
| DE | 3311362 C1 | | 7/1984 |
| DE | 3329328 | | 2/1985 |
| DE | 3326103 A1 | | 3/1985 |
| DE | 4109051 A1 | | 9/1992 |
| DE | 9310593 U1 | | 9/1993 |
| DE | 29903470 U1 | | 9/1999 |
| DE | 10115565 | | 9/2002 |
| DE | 10337122 | | 3/2005 |
| DE | 10337121 B3 | | 6/2005 |
| DE | 102006058422 A1 | | 6/2008 |
| DE | 102010009163 A1 | * | 2/2010 |
| EP | 1031529 A2 | | 2/2000 |
| EP | 1205420 | | 11/2000 |
| EP | 1928777 | | 8/2006 |
| FR | 2201561 | | 4/1974 |
| GB | 182891 A | | 7/1922 |
| GB | 687367 | | 2/1953 |
| GB | 1088878 | | 10/1967 |
| GB | 2117337 A | | 10/1983 |
| GB | 2137150 A | | 10/1984 |
| GB | 2458135 | | 9/2009 |
| JP | 2000042759 | | 2/2000 |
| SE | 9200711 L | | 9/1993 |
| SU | 1181808 | | 9/1985 |

OTHER PUBLICATIONS

HB-System brochure by ABUS Kransysteme GmbH (Aug. 2009).
English translation of foreign document SU 1181808 published on Sep. 30, 1985.

* cited by examiner

ARRANGEMENT FOR CONNECTING TWO RAIL SEGMENTS

CROSS REFERENCE TO RELATED APPLICATIONS

The present application claims the priority benefits of International Patent Application No. PCT/EP2011/065336, filed on Sep. 5, 2011, and also of German Patent Application No. DE 10 2010 037 523.3, filed on Sep. 14, 2010, which are hereby incorporated herein by reference in their entireties.

BACKGROUND OF THE INVENTION

The invention relates to an arrangement of two rail segments consisting of at least one holding element disposed on each rail segment and of at least one connecting means in contact with the holding elements, by which connecting means the rail segments can be connected to each other at their end faces, wherein each holding element is attached to the respective rail segment via a weld seam.

Self-supporting tubular tracks for suspended railways, suspension cranes and the like are known, being composed, in cross-section, of e.g. two thin-walled profiles disposed symmetrically with respect to the vertical longitudinal middle plane. The track forms a travel path for the suspended railways, for which purpose a plurality of track segments are connected in abutment at their rail ends. For this purpose sleeves are attached to the rail ends and receive screw bolts extending in the longitudinal direction of the rail and connecting the track segments to each other. The sleeves are welded to the rails on the outside over their longitudinal extension. Corresponding connections are known from the German patent DE 1 249 301, the German utility model DE 93 10 593 U1 and the German laid-open document DE 41 09 051 A1.

Furthermore, the connection of I-shaped rails to each other via corresponding sleeves is known from the German laid-open document DE 33 26 103 A1. In that case the sleeves are welded to an underside of a lower flange of the I-shaped rail. The weld seam between the underside of the rail and the respective sleeve extends essentially as a rectangle along the long sides and the end faces of the respective sleeve.

In contrast to cuffs (DE 299 03 470 U1) or distributed connecting arrangements (DE 103 37 121 B3 or DE 10 2006 058 422 A1) this type of abutment connection has proved its value because it is simple and effective and does not impede the travel path.

However, there is still a desire for a connection which transmits severe bending moments in the event of dynamic loading and generally supports heavy loading, since the overall carrying capacity definitively depends on this.

SUMMARY OF THE INVENTION

The present invention provides a connecting arrangement for rail segments, which is improved with respect to dynamic loading.

In accordance with an embodiment of the invention, in the case of an arrangement consisting of two rail segments, of at least one holding element disposed on each rail segment and of at least one connecting means in contact with the holding elements, by which connecting means the rail segments can be connected to each other at their end faces, wherein each holding element is attached to the respective rail segment via a weld seam, a connecting arrangement for rail segments, which is improved with respect to dynamic loading, is achieved in that at least one end of the weld seam ends in a region outside the holding element on the rail segment. Owing to the fact that one end of the at least one weld seam extends out of the region of the weld joint between the holding element and the rail segment, the run-out notch of the weld seam is disposed by the continuance of the weld seam outside the critical region of the weld joint. In this way an increase in stress owing to a sudden change in geometry and local separation of the run-out notch from the weld joint is achieved so that the holding element can ultimately be loaded to a greater extent. This also permits greater overall loading of the whole connection.

In an advantageous manner provision is made for the weld seam to extend in the region of the holding element in the longitudinal direction of the rail segment and the end of the weld seam deviates from the longitudinal direction. It is important in this respect for the weld seam to be continued and for it to do so in a linear or arcuate manner at an angle.

It is advantageous if the length of the end is 10 to 30 mm, preferably 15 to 25 mm, particularly preferably 20 mm. Therefore sufficient spacing with respect to the holding element is ensured and the run-out notch of the weld seam is no longer located in the region of the holding element and therefore in the region of the weld joint between the holding element and the rail segment.

The end of the weld seam is preferably remote from the end face of the rail segment. The holding element and thus also the weld seam can therefore be positioned up to the end face itself.

In particular embodiments the end is linear and deviates at an angle from the longitudinal direction of the rail segment, such as at an angle of 15-45 degrees, or 25-35 degrees, and in a particular embodiment 30 degrees.

It is also possible to provide a corresponding weld seam on both sides of the holding element if thus in each case a weld seam extending in the longitudinal direction of the rail segment is disposed on each of the two long sides of the holding element. The two weld seams can thus each have different lengths, angles and lengths at the ends in the case of each holding element.

The rail segments are usually profile rails, wherein it is useful for the rail segments to be hollow profile rails which are composed of two profiles disposed symmetrically with respect to the vertical longitudinal middle plane. It is then useful if the holding elements are disposed on the outsides of the hollow profile rails so that the inner space remains free as a track e.g. for carriages, or contact lines.

Such rails are often have angular spaces or grooves extending in the longitudinal direction for stiffening purposes so that it is useful to dispose the holding elements in longitudinally extending angular spaces or grooves in the rail segments. They therefore do not protrude outwards over the space required by the rail.

The connecting arrangement can be loaded to a particularly great extent if the end of the weld seam extends out of the angular space or groove as far as the flat profile of the rail segment.

The deviating end of the weld seam is thus guided out of the groove and around the edge to a neighbouring flat region of the rail segment.

In an advantageous embodiment, provision is made for the holding elements to have a contact surface, extending transverse to the longitudinal direction of the rail segments, as a counterbearing surface for the connecting means, the holding elements are sleeves, slit sleeves or C-groove profile pieces and the connecting means are screw bolts. A large number of connecting means may be considered for use depending on the holding means in each case. The preferred screw bolts offer simple mounting and strong longitudinal holding forces.

The arrangement in accordance with the invention is suitable, in particular, for connection of rail segments of a crane track or carrier rail of overhead conveyors. In particular, this is a matter of abutment connections in the case of rail segments.

Further details, features and advantages of the invention will become clear from the following description of an exemplified embodiment with reference to the drawings.

DESCRIPTION OF THE PREFERRED EMBODIMENTS

Figure 1:
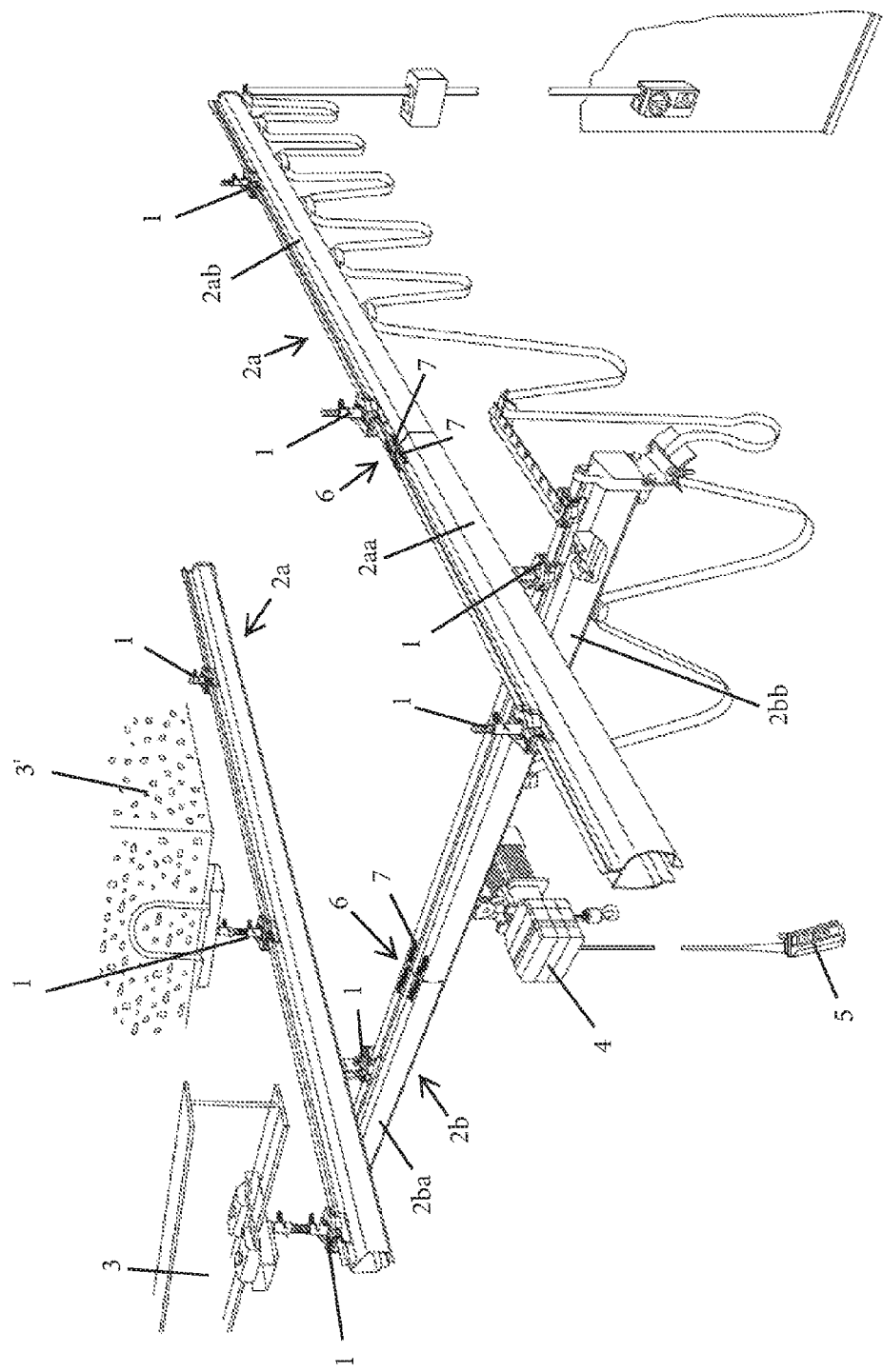
FIG. 1 is a perspective schematic view of a single-girder suspension crane.

FIG. 1 shows a single-girder suspension crane to illustrate the widest range of usage possibilities for connected rail segments for forming rails.

By means of suspension devices 1, rails 2, which extend essentially horizontally and are profiled in a downwardly-open C shape are suspended on carrier elements 3, 3' or further rails 2. The carrier elements 3 are formed as I-beams. Since the present exemplified embodiment relates to a single-girder suspension crane, two first rails 2a extending essentially horizontally in parallel and spaced apart from each other, are provided and serve as travel rails for the single-girder suspension crane, and a second rail 2b which forms a crane rail which is oriented essentially transverse to the first rails 2a and can travel along the first rails 2a. For this purpose the second rail 2b is suspended via two suspension devices 1 each on a travel mechanism, not shown, which can travel along the first rails 2a. A lifting gear 4, such as a chain or cable hoist, is suspended on the second rail 2b in the usual manner and can travel along the second rail 2b with a further travel mechanism, not shown. The lifting gear 4 can be controlled via a pendant switch 5 suspended on the lifting gear 4.

The rails 2a, 2b can thus be used selectively as crane track or carrier rails of overhead conveyors.

The rails 2a and 2b each consist of two or more rail segments 2aa and 2ab or 2ba and 2bb depending on the length required.

The rail segments 2aa and 2ab or 2ba and 2bb are connected to each other via end-face abutment connections 6.

Figure 2:
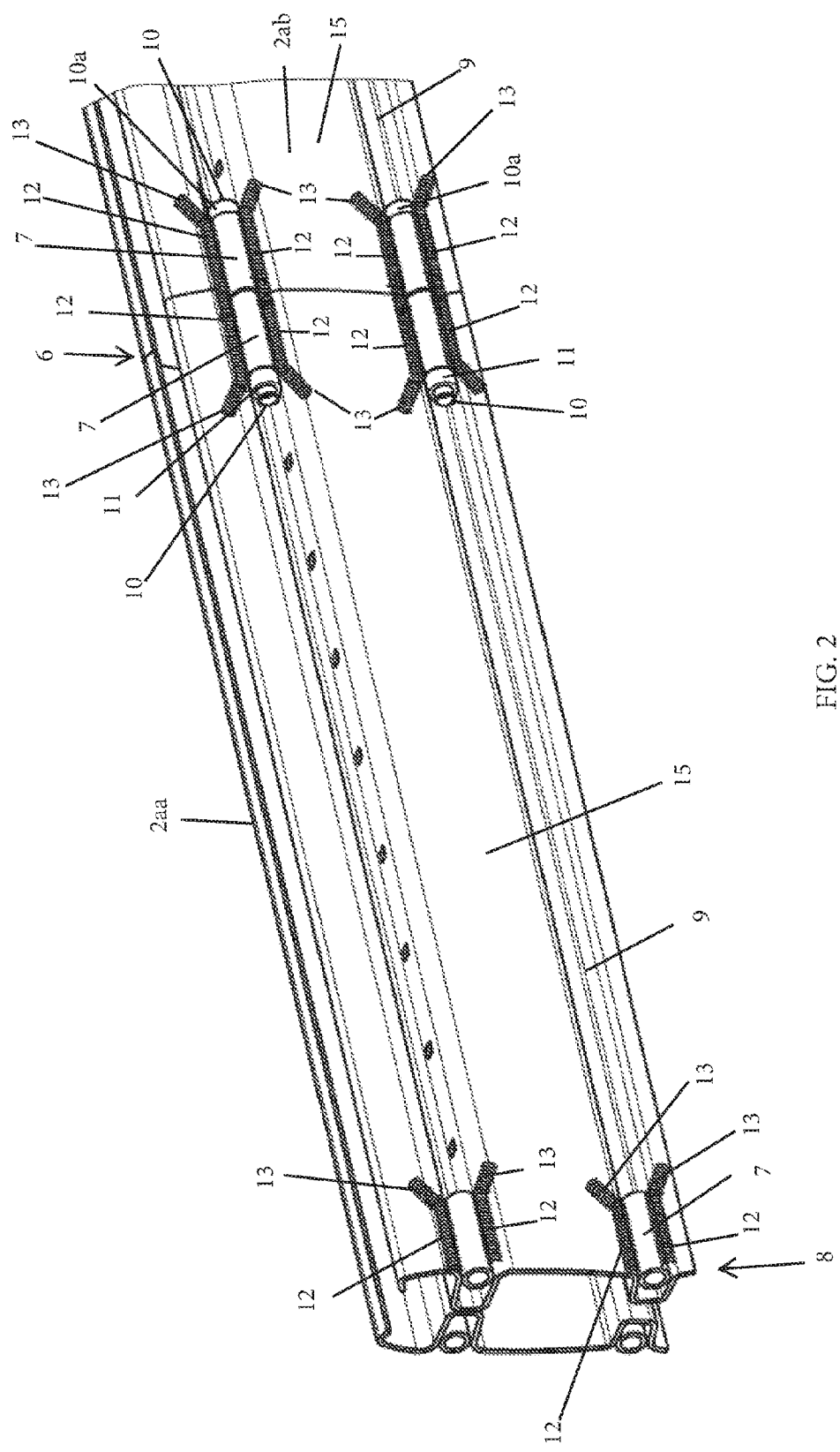
FIG. 2 is a perspective schematic view of two rail segments.
Figure 3:
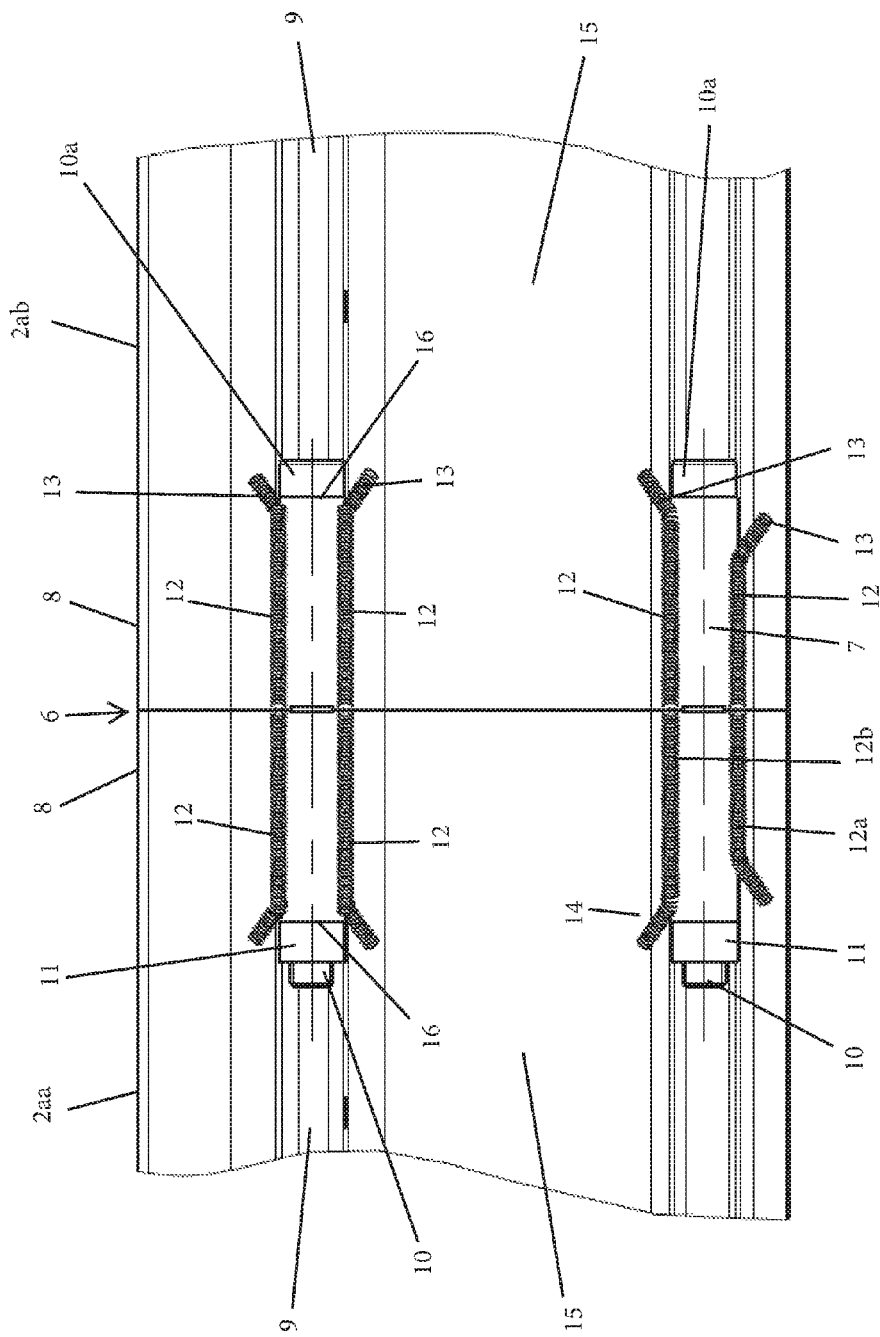
FIG. 3 is an enlarged side view of the abutment connection portion of the rail segments of FIG. 2.

Only the abutment connection 6 of the rail segments 2aa and 2ab is explained hereinunder by way of example with the aid of FIGS. 2 and 3 since that of the rail segments 2ba and 2bb is formed in a corresponding manner. The profile of the rail segments of FIGS. 2 and 3 is only similar to that of FIG. 1 but not identical.

In order to form the abutment connections 6 of the rail segments 2aa and 2ab, the rail segments 2aa and 2ab each have holding elements formed as sleeves 7 on their outer sides, which holding elements are disposed on the rail segment ends 8 in longitudinally extending angular spaces or grooves 9 in the rail segments 2aa and 2ab.

In the illustrated example, four sleeves 7 are used per rail segment, each being disposed in corresponding longitudinal grooves 9. Thus two sleeves 7 are provided per long side of the rail segments.

The sleeves 7 have screw bolts 10 passing through them as connecting elements and, for the heads 10a thereof or the nuts 11 thereof, form a contact surface 16 extending transverse to the longitudinal direction of the rail segments as a counterbearing surface. When screw bolts 10 are used it is important for the corresponding nut 11 to be locked. This can be achieved preferably by a formation of the nut 11 in a cup-shaped manner or tapering conically in the longitudinal direction of the screw bolt 10 so that this nut is pressed into the sleeve 7 during tightening.

The sleeves 7 are attached to the rail segments 2aa and 2ab in each case by a weld seam 12, extending in the longitudinal direction of the rail segment 2aa and 2ab, on each of the two long sides of the sleeves 7. The weld seams 12 do not have to extend over the whole length of the sleeves 7 and can be formed differently from each other as shown by comparison of the weld seam 12a with the weld seam 12b. The weld seams 12 are disposed according to their function in a weld joint between the holding element 7 and the respective rail segment 2aa, 2ab. 2ba, 2bb.

The end 13, remote from the end face, of the weld seam 12 extends out of the weld joint and is therefore located outside the holding element 7. The end 13 of the weld seam 12 is no longer in contact with the holding element 7. In addition, the orientation of the end 13 deviates from the longitudinal direction of the weld seam 12 along the holding element 7. In one embodiment, the end 13 is linear and forms an angle 14 with respect to the rest of the weld seam 12. This angle 14 amounts to 15-45 degrees, preferably 25-35, particularly preferably 30 degrees. The end therefore extends out of the groove 9 to the side surface 15 of the rail profile of the rail segments 2aa, 2ab. 2ba, 2bb, 3. In the illustrated embodiment the length of the end 13 is 10 to 30 mm, preferably 15 to 25 mm, particularly preferably 20 mm.

It is also possible to form the end 13 in an arcuate instead of linear manner. In that case it is important that the direction changes with respect to the longitudinal direction of the rest of the weld seam 12.

REFERENCE LIST

1 Suspension device
2 Rail
2a, 2b Rail
3 Carrier element
4 Lifting gear
5 Pendant switch
2aa, 2ab, 2ba, 2bb Rail segment
6 Abutment connection
7 Sleeve
8 End of rail segment
9 Groove
10 Screw bolt
10a Head of screw bolt
11 Nut
12 Weld seam
12a, 12b Weld seam
13 End
14 Angle
15 Side surface
16 Contact surface

The invention claimed is:

1. An arrangement of two rail segments comprising a plurality of holding elements disposed on each rail segment and at least one connecting element in contact with one of the holding elements of each rail segment, by which connecting element the rail segments can be connected to each other at end faces of the two rail segments, wherein each rail segment includes a pair of opposing outer sides, and wherein each outer side includes a side surface that extends between a pair of longitudinal grooves, wherein at least one holding element is disposed within each longitudinal groove and wherein each holding element is attached to the respective rail segment via a weld seam with the weld seam having an end that extends away from the holding element so that the end of the weld seam ends in a region of the side surface outside the holding element on the rail segment, wherein each weld seam includes a longitudinal portion extending at the respective longitudinal groove and wherein the end of the weld seam extends from the longitudinal portion and is linear and deviates at an angle from the longitudinal portion of the weld seam, and wherein each side surface of each rail segment includes a flat profile, and wherein the ends of the weld seams extend out of the longitudinal grooves as far as the flat profile on each rail segment.

2. The arrangement as claimed in claim 1, wherein the length of the end is 10 to 30 mm.

3. The arrangement as claimed in claim 1, wherein the end is remote from an end face of the holding element.

4. The arrangement as claimed in claim 3, wherein each holding element comprises two long sides, and wherein for each rail segment the weld seam extending in the longitudinal direction is disposed on one of the two long sides of the holding element, and wherein an additional weld seam extends in the longitudinal direction of the rail segment and is disposed on the other of the two long sides of the holding element, and wherein the additional weld seam includes at least one end that extends away from the holding element so that the end of the additional weld seam ends in a region outside the holding element on the rail segment.

5. The arrangement as claimed in claim 4, wherein the weld seams on each long side of each holding element have different lengths, angles and lengths in the deviation.

6. The arrangement as claimed in claim 1, wherein the rail segments are hollow profile rails which are composed of two profiles disposed symmetrically with respect to the vertical longitudinal middle plane, and the holding elements are disposed on the outer sides of the rail segments.

7. The arrangement as claimed in claim 1, wherein the holding elements have a contact surface, extending transverse to the longitudinal direction of the rail segments, as a counterbearing surface for the respective connecting element, and wherein the holding elements comprise sleeves or C-groove profile pieces and the connecting element comprise screw bolts.

8. The arrangement as claimed in claim 1, wherein the angle is 15-45 degrees.

9. The arrangement as claimed in claim 1, wherein each holding element comprises two long sides, and wherein for each rail segment the weld seam extending in the longitudinal direction is disposed on one of the two long sides of the holding element, and wherein an additional weld seam extends in the longitudinal direction of the rail segment and is disposed on the other of the two long sides of the holding element, and wherein the additional weld seam includes at least one end that extends away from the holding element so that the end of the additional weld seam ends in a region outside the holding element on the rail segment.

10. The arrangement as claimed in claim 9, wherein the weld seams on each long side of each holding element have different lengths, angles and lengths in the deviation.

* * * * *